Figure 1:
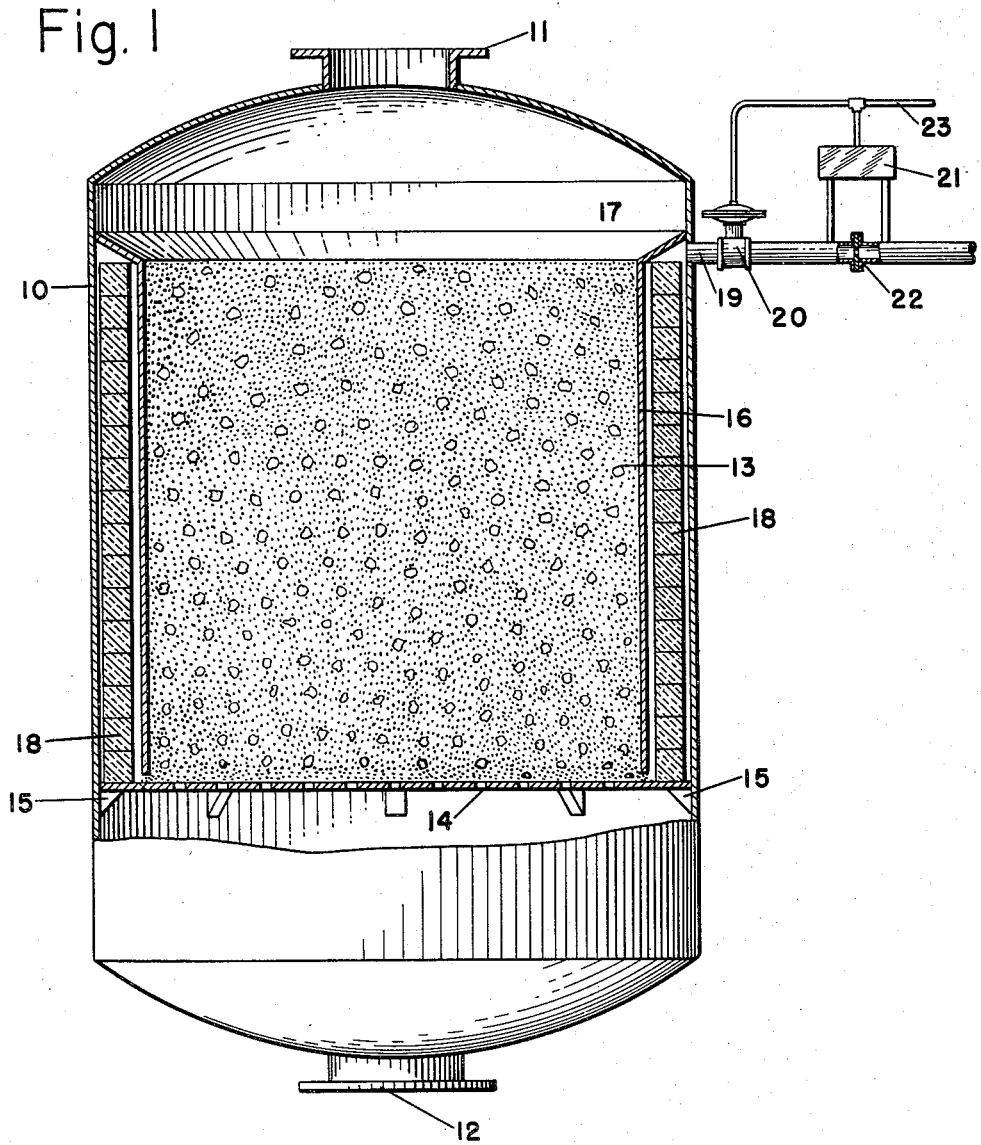

April 10, 1951     L. W. T. CUMMINGS     2,548,519
APPARATUS FOR CONDUCTING HIGH TEMPERATURE REACTIONS
Filed Nov. 14, 1947     2 Sheets-Sheet 1

INVENTOR.
LELAND W. T. CUMMINGS
BY
ATTORNEYS

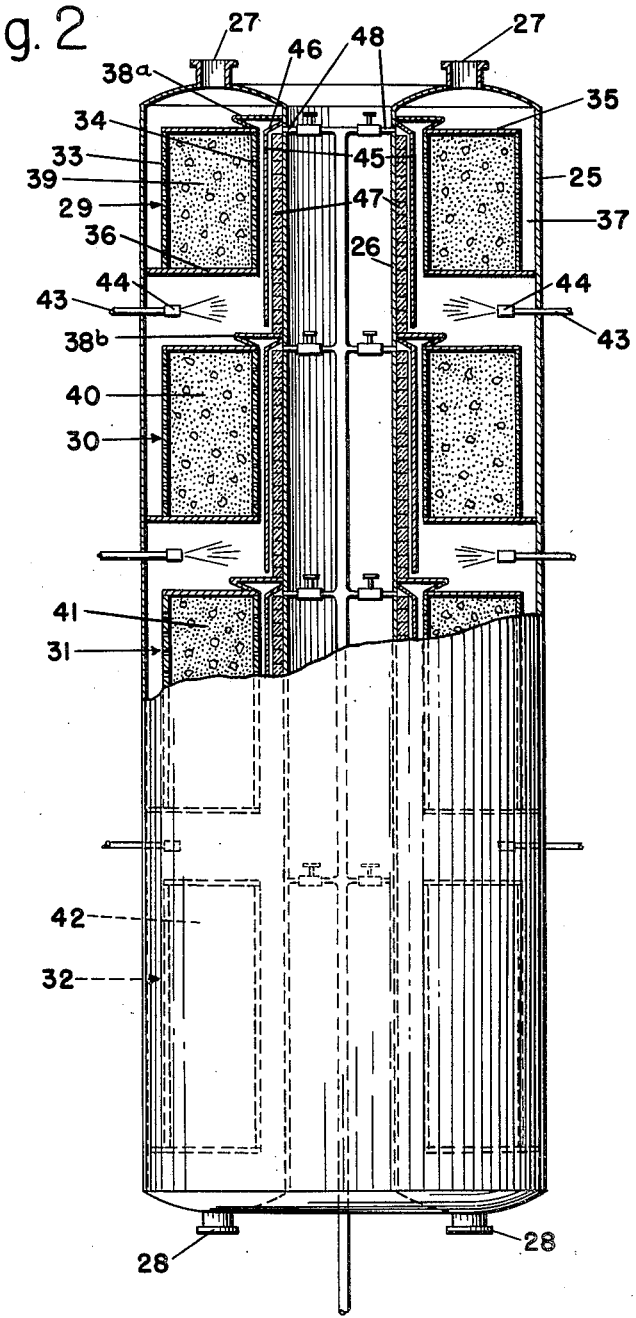

Patented Apr. 10, 1951

2,548,519

UNITED STATES PATENT OFFICE 2,548,519

APPARATUS FOR CONDUCTING HIGH-TEMPERATURE REACTIONS

Leland W. T. Cummings, Wyncote, Pa., assignor to Sun Oil Company, Philadelphia, Pa., a corporation of New Jersey Application November 14, 1947, Serial No. 786,131

3 Claims. (Cl. 23—288)

This invention relates to an apparatus for conducting reactions of fluids at high temperature. In a more specific aspect the invention is directed to a reaction apparatus for carrying out processes involving alternate endothermic and exothermic reactions and adapted to operate such processes in such manner as to minimize heat transfer between the reactants and the wall of the apparatus. A typical process of this type is the catalytic conversion of hydrocarbons in a cyclic operation, wherein hydrocarbons are caused to react endothermically in the presence of a catalyst, causing deposition of carbonaceous material on the catalyst which reduces its activity, and the catalyst is then reactivated by burning off the carbonaceous matter. The catalytic cracking of higher boiling hydrocarbons to lower boiling hydrocarbons is a specific example of this type of process. Other examples are reforming, dehydrogenation and the like.

Processes for the conversion of hydrocarbons are well known and may be generally classified as either catalytic processes or thermal processes conducted without the aid of a catalyst. Among the catalytic processes, several different procedures have been utilized, these being generally referred to as the fixed bed method, the moving bed method and the fluid type operation. The present invention is applicable to any of these processes, both thermal and catalytic, as well as to other chemical processes conducted at high temperatures. For purpose of illustration, the invention will be described with particular reference to the cracking of hydrocarbons in the presence of a stationary granular contact mass; but it will be understood that the invention is applicable to other fluid reactions conducted at high temperatures.

Converters used in hydrocarbon cracking processes are frequently required to operate under substantial pressure and yet also at temperatures at which ordinary steel becomes relatively weak, for example, at temperatures of the order of 1000–1200° F. In order to protect the shell of the converter against such temperature, an insulating material may be used. Such insulation may comprise firebrick, asbestos or other inert material of low heat conductivity disposed between the reaction chamber and the outer shell. If the hydrocarbons are permitted to come in contact with the insulating material during the on-stream or endothermic reaction period, carbonaceous deposits will tend to build up on the insulation and may, during a subsequent regeneration period, suddenly catch on fire and generate sufficient heat to seriously injure or destroy the outer shell. In order to obviate this difficulty, it has been proposed to seal off the insulating material from the reactants by means of a heat resistant liner, such as a special alloy steel, which is welded to the outer shell at each end of the liner so as to form a fluid tight compartment enclosing the insulating material. In actual practice, however, it has proved difficult to maintain a fluid tight compartment and frequently during continued operation leakage through the liner may occur. In such case, hydrocarbon reactants will seep into the insulating compartment, causing deposition of carbonaceous matter which during a subsequent regeneration period may ignite, resulting in serious damage to the converter.

The present invention is directed to improved reaction or conversion apparatus which is not subject to the aforesaid disadvantages and which is therefore safer and better adapted for practicing large scale conversion operations, the apparatus being operable to so conduct such reactions as to overcome the aforesaid disadvantages and also to prevent or minimize interchange of heat between the contents of the reaction chamber and the wall or walls of said chamber. The features and advantages of the invention can best be understood by reference to the accompanying drawings, in which:

Figure 1 is an elevational view, partly in section, of one form of reactor or converter embodying the invention; and Figure 2 is an elevational view, partly in section, of another form of converter embodying the invention, this modification being especially adapted for adiabatic type operation.

Referring first to Figure 1, the body of the converter comprises a cylindrical outer shell 10 having inlet and outlet connections or nozzles 11 and 12 located at opposite ends of the shell. Means are provided within the shell for maintaining a bed of granular contact material 13 which may be a granular catalyst or an inert contact material of high heat absorbing capacity (for example, artificially fused oxide such as described in Houdry Patent No. 2,414,812) or a mixture of catalyst and inert heat absorbing material, depending upon the particuar type of operation in which the apparatus is to be employed. The means for maintaining the bed of contact material within the reactor may comprise a support plate 14 which is perforated to permit flow of fluids therethrough and which may be supported within the reactor in any suitable manner, for example, by means of support lugs 15 attached to the shell 10. If desired, the converter may include means (not shown) for circulating a heat transfer material in indirect heat exchange relation with the contact mass in well known manner.

A metallic liner 16 made of any suitable heat resistance material such as a special alloy steel, is interposed between bed 13 and the outer shell 10 so as to form a peripheral or annular space therebetween. Liner 16 defines the periphery of the bed and serves to support the contact material from the side. The top of the peripheral space may be closed off in any suitable manner, for example, by means of a cover member 17 which extends from the top of the liner 16 to the outer shell 10 and is welded to each. As shown in Figure 1 liner 16 extends downwardly toward support plate 14 but stops short of the same so as to provide an opening at the bottom of the peripheral space for communication between the peripheral space and the reaction chamber. The cover member 17 serves to carry or support liner 16 in this position. An alternative arrangement (not shown) which would serve the same purpose could be utilized, if desired, by permitting liner 16 to extend to and connect with support plate 14 and by providing openings through the support plate adjacent the bottom of the peripheral space. In such cases, a suitable expansion joint should be provided at the top of the liner to take care of differential longitudinal expansion between the liner and the outer shell. Also, if desired, liner 16 may be corrugated circumferentially to permit longitudinal expansion and contraction, or it may be corrugated longitudinally to take care of radial expansion and contraction.

A suitable insulating material 18 such as firebrick, asbestos or the like is disposed within the peripheral space around the bed to form an insulating zone for protecting the outer shell 10 from high temperatures developed within the bed during the exothermic or regeneration period. In order to prevent any of the reaction fluids or reactants in the reaction chamber from entering the insulating zone and coming in contact with the insulation, means are provided for continuously introducing an inert gas into, and flowing it through, the zone. The insulating material may be pervious or non-pervious but in any case should be of such form that there will be an opening or passageway for flow of the inert gas through the insulating zone. The inert gas is not used for heat transfer purposes but merely to blanket the insulating material and prevent reactants from getting into the peripheral space. In fact, the amount of inert gas introduced may be relatively so small that the heat transferred thereto from the bed of contact material will be negligible.

As shown in Figure 1, the means for introducing the inert gas may comprise an inlet line 19 communicating with the insulating zone and having a flow control valve 20 for regulating the rate of introduction of the inert gas. An orifice meter or flow rate controller 21 associated with a constriction 22 in line 19 serves to operate valve 20 by means of air pressure supplied through air line 23 so as to maintain the flow of inert gas into the insulating zone at the desired rate. The control of flow rates in this manner is well known and need not be described in further detail. It is apparent that other known or suitable means for controlling the rate of flow may be employed, including hand control if for any reason the installation of automatic control apparatus is found to be undesirable.

During operation of the converter, an inert gas such as steam, flue gas or nitrogen is introduced at a pressure above the pressure within the reaction chamber through valve 20 and line 19 into the insulating zone. The amount of gas introduced may be controlled by means of rate controller 21 and valve 20 so as to maintain the insulating zone at a slightly or somewhat higher pressure than the reaction chamber in order to insure continuous flow of the inert gas through the insulating zone, out of the opening at the bottom and into the reaction chamber. This will prevent fluid reactant material or reaction products from entering the insulating zone from the reaction chamber and forming carbonaceous deposits on the insulating material, and thus eliminate the possibility of causing a fire within the insulating zone. Even in cases where there is no danger of a fire resulting from deposition of the carbonaceous material within the porous insulation, as for example where the converter is being used to conduct only the endothermic conversion reaction such as in a moving bed type of operation, the above described method is nevertheless advantageous, since it will prevent the formation of carbonaceous deposits that otherwise would lower the thermal insulating efficiency of the insulating material. Where the operation of the reactor involves alternate on-stream and regeneration operations, the inert gas may, if desired, be passed through the insulating zone only during the on-stream period.

It will be apparent that the opening which provides limited fluid communication between the insulating zone and the reaction chamber need not be located at the bottom of the insulating zone, nor is it necessary that the means for introducing the inert gas therein shall communicate with the top of the zone as shown in Figure 1. To operate the apparatus in the way described above, it is only necessary that the inert gas be supplied to some locus within the insulating zone at a pressure higher than the pressure in the reaction chamber and that the zone be in limited fluid communicating relation with the reaction chamber. The opening between the insulating zone and the reaction chamber may, if desired, be at the top of the insulating zone or at an intermediate level, so long as the gas used is not substantially deleterious to the catalyst, the reactants or products at the concentrations at which the gas would occur within the reaction chamber. Where the gas is not substantially inert with respect to the catalyst, although it is with respect to the insulating material, reactants and reaction products, it is desirable that it leave the insulating zone at the end adjacent the outlet end of the reactor as shown in Figure 1 so as to minimize contact with the catalyst. If desired, a shallow layer of granular inert material could be positioned at the bottom of the catalyst bed in such case to eliminate any possibility of contact between the gas and the catalyst.

The herein described method of preventing contact of the reaction fluids with the insulating material is equally applicable where the liner 16 which defines one side of the peripheral space or insulating zone is apt to develop cracks during operation of the converter. In such case the inert gas will continuously flow not only through the opening provided for communication between the insulating zone and the reaction chamber but also through the cracks which have developed, thereby preventing any ingress of reactant fluids into the insulating zone.

It will also be apparent that the invention is equally applicable where a horizontal reactor or converter is employed instead of a vertical one as shown in Figure 1.

Figure 2 illustrates an improved converter which is especially adapted for use in a catalytic conversion process involving adiabatic operation. In this type of operation, both the endothermic and exothermic reactions are carried out without the use of a circulating convective fluid for supplying heat to, or removing heat from, the reaction zone by indirect heat transfer. In other words, heat required for the endothermic reaction is supplied either as sensible heat of the reactants entering the reaction zone or as heat stored in the contact mass during the previous regeneration period, while heat evolved during the exothermic reaction either is stored in the contact mass for use in the subsequent on-stream period or else is removed from the reaction zone in the form of sensible heat of the effluent regeneration gases.

In Figure 2 the converter comprises a vertically elongated cylindrical outer shell 25 and a vertically elongated cylindrical inner shell 26 concentrically disposed therein to form an annular space between the shells. Manifold means are provided at the top of the annular space for introducing reactants therein through one or more inlet connections or nozzles 27 and similar manifold means are provided at the bottom for withdrawing the reaction products from the bottom of the converter through one or more connections or nozzles 28. Located within the annular space between the inner and outer shells are a plurality of superposed annular trays, shown generally as 29, 30, 31 and 32, which are positioned in spaced apart relation to each other and are each adapted to retain a bed of granular contact material. While for purpose of illustration four such trays are shown, it will be understood that any suitable or desired number may be provided. Since all of the trays may be of similar construction the following description thereof is made with specific reference only to the upper trays.

Each tray may comprise an outer wall 33 and an inner wall 34, each of which is perforated to permit flow of fluids therethrough, and imperforate top and bottom members, shown respectively as 35 and 36. Outer wall 33 has a diameter substantially less than the outer shell 25 so as to provide an annular space 37 at the outer side of each tray. Inner wall 34 has a diameter substantially greater than the inner shell 26 so that the inner side of each tray will be sufficiently spaced apart from the inner shell 26 to provide room for insulating material. The bottom 36 of the tray extends radially outward to outer shell 25 to close off annular space 37 at its bottom. The space between each tray and inner shell 26 is closed at the top by means of an expansion joint indicated generally at 38—a. With this tray arrangement it is apparent that reactants entering the top of the reactor will flow into outer annular space 37, thence passing inwardly through the bed in a generally horizontal direction and issuing from the bed into the space between inner perforate wall 34 and the inner shell 26. From there, the vapors will pass downwardly and into the outer annular space surrounding the next lower tray and then through the tray in like manner, etc.

The trays are filled with a granular contact material, illustrated in the drawings by numerals 39, 40, 41 and 42, which preferably is a mixture of catalyst (for example, a silica-alumina type catalyst if the reaction to be conducted is the cracking of hydrocarbons), and a granular inert material of high heat absorbing capacity (for example, artificially fused oxide such as described in Houdry Patent No. 2,414,812). The proportion of catalyst to heat absorbing material may vary widely depending upon the particular materials used and the amount of heat that it is desired to store in the contact mass during each cycle, but generally will be within the range of 1:5 to 3:1.

In the space between adjacent beds of catalytic contact material, means are provided for introducing additional amounts of reactants in the form of a fine liquid spray into the vapor stream passing from the upper bed to the next lower bed. For example, between the upper tray 29 and the next lower tray 30 a plurality of inlet lines 43 leading to spray nozzles 44 may be provided for injecting the reactants into, and preferably against, the vapor stream flowing between the trays. Similar arrangements are provided for introducing liquid reactants between other trays. It will be noted that the trays are illustrated as being of increasing height from the top to the bottom of the reactor. This is desirable in order to compensate for the additional reactants introduced between the trays so as to maintain the space velocities in the several beds at about the same value.

A heat resistant metallic liner 45 is disposed in the space between the inner perforate wall 34 of each tray and the inner shell 26 to form an annular space around the inner shell adjacent the inner side of the tray. The top of the annular space is closed off by means of a suitable cover member 46 extending from the top of liner 45 to inner shell 26. Liner 45 preferably extends downwardly below the bottom of tray 29 and almost to the expansion joint 38—b associated with the next lower tray. Suitable insulating material 47 such as firebrick or asbestos is disposed within the annular space between liner 45 and inner shell 26 so as to form an insulating zone for protecting the inner shell from the high temperature of the vapors issuing from bed 29. Such insulation may be supported in place by means of expansion joint 38—b of the next lower tray as illustrated in Figure 2. One or more valved inlet lines 48 communicate with the annular space between liner 45 and inner shell 26 for introducing inert gas into the insulating zone. Similar arrangements are provided adjacent each of the other trays to protect the inner shell 26 from the hot vapors issuing from the trays. Means for automatically regulating the flow of gas to each insulating zone may be provided, if desired, in the same manner as described in connection with Figure 1.

In operation of the converter of Figure 2, during the on-stream or endothermic reaction period, hydrocarbon reactants are introduced into the top of the reactor through inlets 27 and pass into the outer annular space 37 and inwardly through the uppermost catalyst bed 29. In passing through bed 29 the reacants will absorb heat from the contact material 39 in excess of that necessary for the endothermic conversion reaction and accordingly the hydrocarbons flowing out of bed 29 will be at a higher temperature than the reactants entering the bed. For example, the reactants flowing into bed 29 may have a temperature of say 800–900° F., whereas the hydrocarbons issuing from the bed may have a temperature of 1000–1100° F. Liner 45 and insulation 47 serve to protect inner shell 26 from the hot vapors issuing from the bed, and the steam or other inert gas introduced through lines 48 keeps the insulating material 47 blanketed and thereby prevents hydrocarbons from coming in contact with the insulation.

The temperature of the vapors flowing from bed 29 will be higher than desired for reaction in the next lower catalytic bed 30. The excess heat in the vapors from bed 29 is utilized to vaporize the liquid reactants injected through lines 43 and spray nozzles 44, so that the temperature of the mixture passing to bed 30 will be at the desired value. For example, the vapors issuing from bed 29 may have a temperature of 1000–1100° F. whereas the temperature of the mixture after addition of the spray material through nozzles 44 may be 800–900° F. The resulting vapor mixture then passes through bed 30 where heat is again picked up in excess of that necessary for maintaining the catalytic conversion reaction, and after passing through the bed the vapors commingle with the next liquid spray so that the temperature is again reduced before the mixture passes to bed 31, etc.

It is apparent that while in Figure 2 insulating means have been provided only on the inner side of each bed, similar arrangements may, if desired, be provided on the outer side in order to protect the outer shell of the converter. It will also be evident that the trays may be arranged to cause the reactants to flow from the inner side of the tray to the outer side of the tray, in which case insulating means should be provided to protect the outer shell from the hot vapors issuing from each bed.

It will be understood that the embodiments shown in Figs. 1 and 2 have the features in common of a reaction chamber and in insulating space, the difference being that in Fig. 1 the reaction chamber is entirely surrounded by and enclosed in the liner, while in Fig. 2 the reaction chamber is of annular contour with the shell constituting its outer wall and the liner constituting its inner wall; although in the modification described in the immediately preceding paragraph the liners would completely enclose the reaction chamber.

It will be understood that numerous modifications in the construction of the converter may be made without departing from the scope of the invention.

Having described my invention, what I claim and desire to protect by Letters Patent is:

1. In a converter providing a reaction chamber for conducting conversion reactions at high temperature; a shell forming a wall of the converter; a substantially imperforate heat resistant liner within the converter spaced apart from said shell and forming therewith a peripheral space adjacent the reaction chamber; a cover member extending from the top of the liner to said shell and closing off the top of said peripheral space; porous insulating material within said peripheral space for protecting said shell from the high temperature within the reaction chamber; a support member adjacent the bottom of the peripheral space adapted to maintain said insulating material in place, said liner extending downwardly to adjacent said support member without abutting thereagainst, so as to provide an opening for restricted communication between the peripheral space and the reaction chamber; and conduit means communicating from without said shell to said peripheral space for introducing therein an inert gas.

2. Reaction apparatus for conducting fluid reactions at high temperature which comprises a reaction chamber having a reaction zone in its interior, a heat resistant liner within the chamber forming with a side wall thereof a peripheral space, members positioned in spaced relation from the end walls of the chamber and extending across the ends of said peripheral space, said peripheral space having insulating material disposed therein for preventing interchange of heat between the reaction zone and the side wall of the chamber and being in restricted fluid communication with the reaction zone through a narrow passageway, fluid inlet means at one end of the chamber directly communicating with the reaction zone for introducing reactant thereto, fluid outlet means at the other end of the chamber for removing reaction product, and a second fluid inlet means communicating with said peripheral space for passing an inert gas, in the absence of reactant, therethrough and into the interior of the chamber.

3. Reaction apparatus according to claim 2 wherein said narrow passageway for providing restricted fluid communication between said peripheral space and the reaction zone is adjacent the reaction product outlet from said zone and wherein said fluid inlet means is remote from said narrow passageway.

LELAND W. T. CUMMINGS.

REFERENCES CITED

The following references are of record in the file of this patent:

UNITED STATES PATENTS

| Number | Name | Date |
|---|---|---|
| 1,803,306 | Stengel | Apr. 28, 1931 |
| 1,911,608 | Davis et al. | May 30, 1933 |
| 1,931,898 | Jenness | Oct. 24, 1933 |
| 2,062,333 | Prickett | Dec. 1, 1936 |
| 2,374,511 | Upham | Apr. 24, 1945 |
| 2,398,546 | Messmore | Apr. 16, 1946 |

FOREIGN PATENTS

| Number | Country | Date |
|---|---|---|
| 12,419 | Great Britain | of 1903 |